Figure 1:
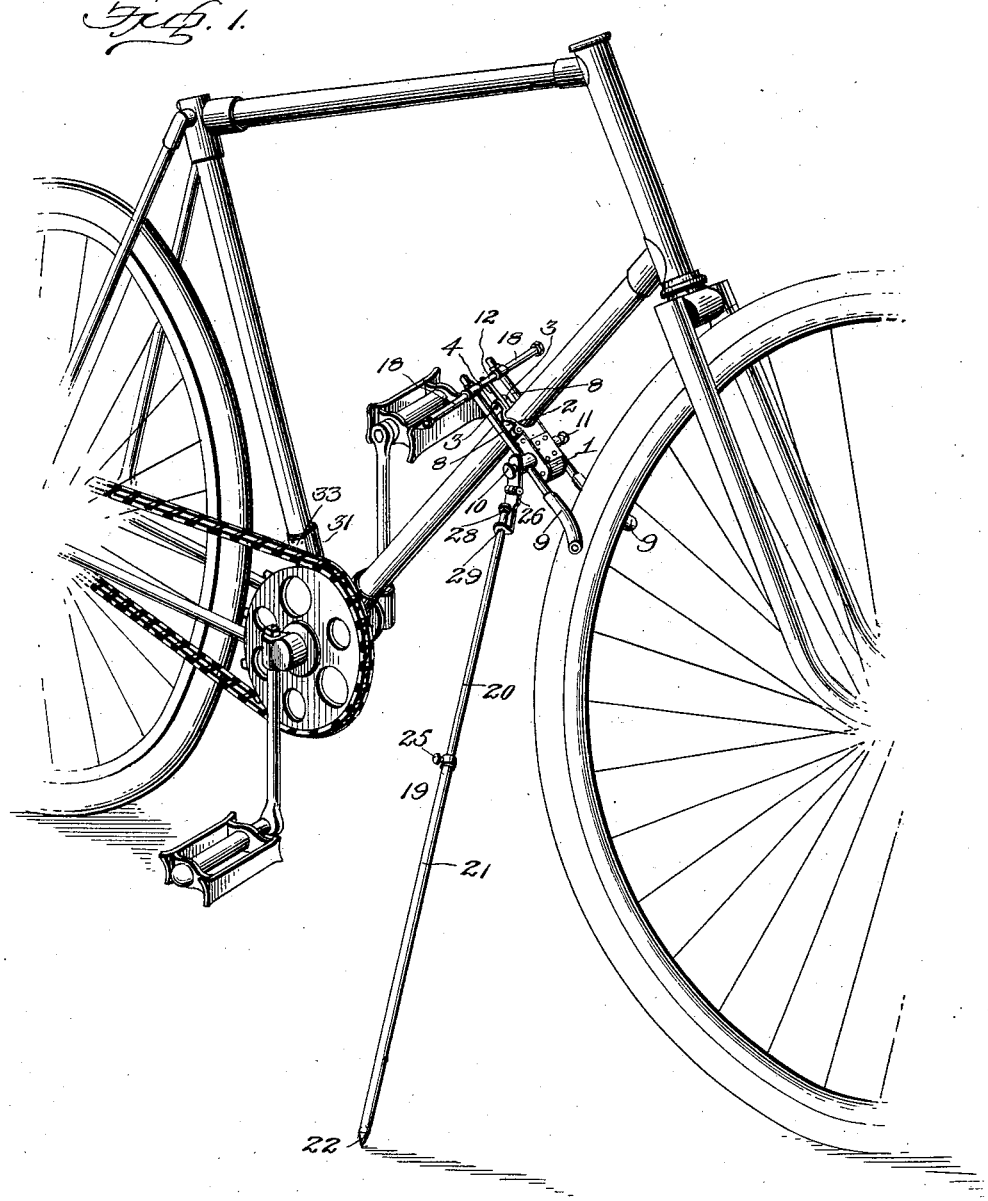

No. 701,696. Patented June 3, 1902.
H. M. FALCINA.
BICYCLE SUPPORT.
(Application filed Mar. 6, 1902.)
(No Model.) 2 Sheets—Sheet 1.

Witnesses
Inventor
H. M. Falcina
By Attorneys

No. 701,696. Patented June 3, 1902.
H. M. FALCINA.
BICYCLE SUPPORT.
(Application filed Mar. 6, 1902.)
(No Model.) 2 Sheets—Sheet 2.
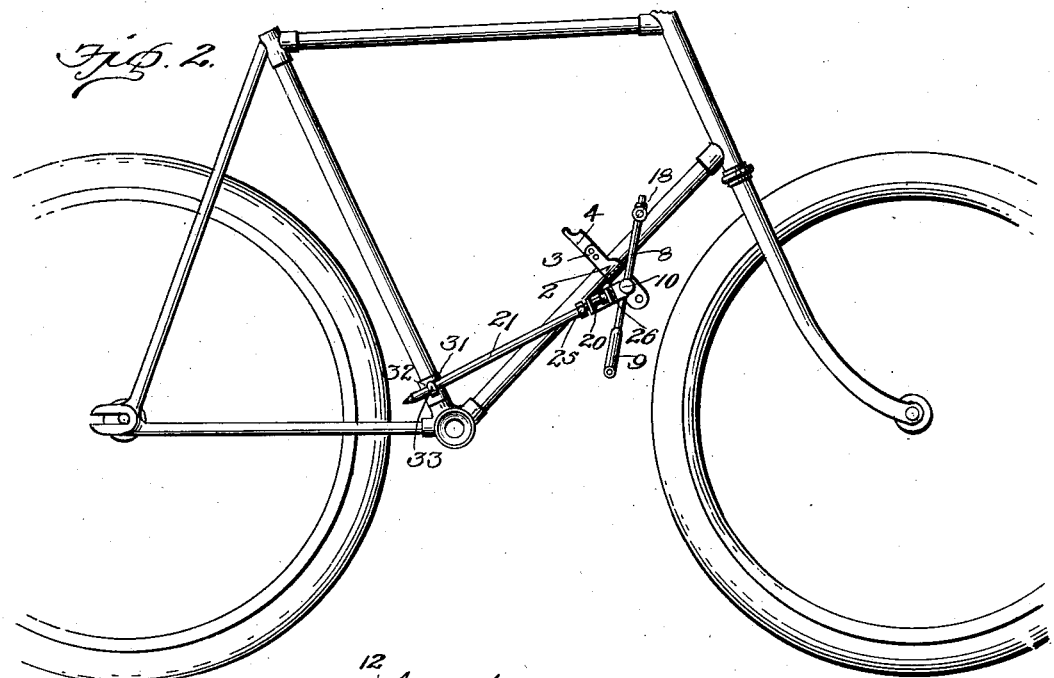
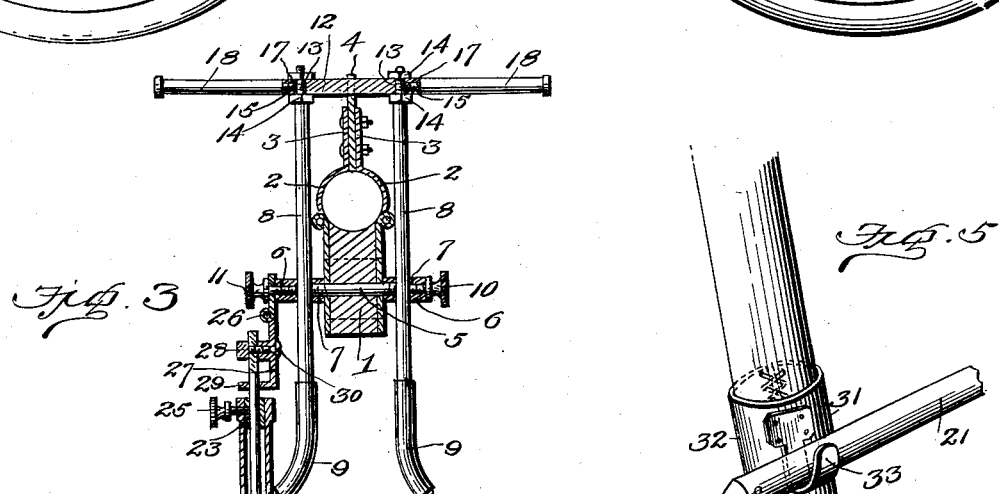
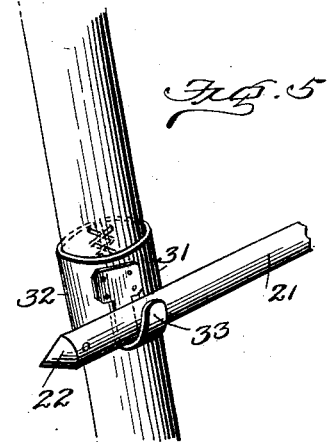
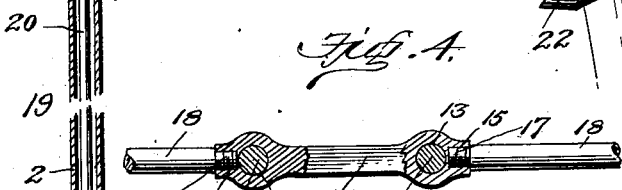
Inventor
H. M. Falcina

UNITED STATES PATENT OFFICE.

HENRY M. FALCINA, OF ROCKLAND, MAINE.

BICYCLE-SUPPORT.

SPECIFICATION forming part of Letters Patent No. 701,696, dated June 3, 1902.

Application filed March 6, 1902. Serial No. 96,985. (No model.)

*To all whom it may concern:*

Be it known that I, HENRY M. FALCINA, a citizen of the United States, residing at Rockland, in the county of Knox and State of Maine, have invented certain new and useful Improvements in Bicycle-Supports; and I do declare the following to be a full, clear, and exact description of the invention, such as will enable others skilled in the art to which it appertains to make and use the same.

The invention relates to bicycle-supports of that character designed for supporting a bicycle after the rider has dismounted and locking the steering-wheel to prevent it from swinging from one side to the other or rotating.

The object of the invention is to provide a device of this character which shall be simple of construction, durable in use, comparatively inexpensive of production, and efficient in action, provision being made whereby the device when not in use as a support may serve as a coaster or foot-rest.

With this and other objects in view the invention consists of certain novel features of construction, combination, and arrangement of parts, which will be hereinafter more fully described, and particularly pointed out in the appended claims.

In the accompanying drawings, Figure 1 is a perspective view illustrating the application of the invention, showing the prop-leg and wheel-holder in operative position. Fig. 2 is a side elevation illustrating the prop-leg swung upwardly and connected with the seat-mast and the wheel-holder moved from engagement with the steering-wheel. Fig. 3 is a front view, on an enlarged scale and partly in section, of the device. Fig. 4 is a top plan view illustrating the coupling for connecting the foot-rests or coasters to the wheel-holder; and Fig. 5 is a detail perspective view of a portion of the seat-mast, illustrating the holder for supporting the prop-leg when not in operative position.

Referring to the drawings, 1 denotes a block to the upper end of which are hinged the members 2 of a clamp designed to be secured to the lower tube of a bicycle-frame and provided with parallel ears 3, between which is fixed a stop 4.

5 denotes a pivotal pin which extends through the block and is threaded at its ends to receive sleeves 6, which are also screw-threaded at their ends and are formed with vertical apertures 7, that receive the arms 8 of the steering-wheel holder, these arms at their lower ends being curved or divergent from each other and provided with rubber or like flexible or elastic sheathings 9 to prevent abrasion of the wheel-tire.

10 and 11 denote set-screws which are engaged with the outer screw-threaded ends of the sleeves 6 and serve to clamp the arms 8 of the wheel-holder to the sleeves, so that said arms, sleeves and pin may have a free pivotal connection with the block and the arms be held in the desired adjustment with respect to the sleeves. The upper ends of the arms are connected by a bar 12, which has vertically-disposed apertures 13, through which the arms are inserted, and nuts 14 are screwed upon these arms, one set before the arms are inserted through the apertures of the coupling-bar and the other set after the bar has been engaged with the arms, whereby said bar is firmly clamped in position. The ends of said arms are provided with screw-threaded apertures 15, which, if desired, may be engaged by the screw-threaded ends 17 of the foot-rests or coasters 18.

19 denotes the prop-leg, which preferably consists of telescopic sections 20 and 21, the former being a rod and the latter a tube within which the rod moves. The tube is provided at its lower end with a point 22 and at its upper end with a packing-ring 23, brazed to the interior walls of the tube and designed to serve as a stop for the head of a screw 24, which is engaged with the lower end of the rod, and thus prevent the accidental disengagement of the tube from the rod. When the tube and the rod are adjusted one with respect to the other, they are maintained in that adjustment by a set-screw 25, which works through the upper end of the tube and packing-ring and engages the rod. This prop-leg is supported from the block 1 by a hinge 26, the upper end of which is provided with an aperture through which the set-screw 11 passes and by means of which the hinge is fastened to one of the sleeves 6. The lower section or link of the hinge 27 is provided with alined guide-eyes 28 and 29, through the former of which works a set-screw 30 to clamp the rod 20 in its proper adjustment with respect to the hinge.

31 denotes a holder for the prop-leg when the latter is not in use, and consists of a flexible band 32, placed around the seat-mast and provided with a hook 33, with which the prop-leg is adapted to be engaged.

In operation when the rider dismounts he disengages the prop-leg from the hook 33 and swings it forward and outward, and this adjusts the sections of the prop-leg to the desired length and locks them by the set-screw 25. This movement of the prop-leg forwardly and outwardly throws the wheel-holder into engagement with the steering-wheel, and now by leaning the bicycle slightly to one side it may be safely supported, the prop-leg preventing it from tilting over, while the wheel-holder checks the rotary motion of the wheel as well as prevents the swinging of the wheel to one side. Before remounting the wheel the rider adjusts the length of the prop-leg and then swings it rearwardly and inwardly toward the side of the frame and engages it with the hook 33, as shown in Fig. 2 of the drawings, in which position the device is out of the way and will not interfere with the movement of the limbs of the operator. When the parts are in this position, the foot-rests or coasters 18 may be used for supporting the feet of the rider.

From the foregoing description, taken in connection with the accompanying drawings, the construction, mode of operation, and advantages of the invention will be understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. In a device of the character described, the combination with a block, means for clamping it to a bicycle-frame, and a stop carried by said block, of a wheel-holder consisting of two arms pivoted to said block and adapted with their lower ends to grasp the steering-wheel and hold it against movement and having their upper ends screw-threaded, a bar having apertures through which the screw-threaded ends of said arms project and formed with screw-threaded sockets, nuts engaged with the said screw-threaded ends, and coasters or foot-rests having screw-threaded ends to engage the screw-threaded sockets, substantially as set forth.

2. In a device of the character described, the combination with a block, clamps hinged to said block and adapted to be clamped about the tube of a bicycle-frame, a stop secured to said clamps, of a wheel-holder consisting of two arms pivoted to said block and adapted with their lower ends to engage and hold the steering-wheel, a coupling for connecting the upper ends of said arms and for engaging the stop to limit the movement in one direction of the wheel-holder, substantially as set forth.

3. In a device of the character described, the combination with a block, clamps hinged to said block and adapted to be clamped about the tube of a bicycle-frame, a stop secured to said clamps, of a wheel-holder consisting of two arms pivoted to said block and adapted with their lower ends to engage and hold the steering-wheel, a coupling for connecting the upper ends of said arms and for engaging the stop to limit the movement in one direction of the wheel-holder, and coasters or foot-rests removably connected to the outer ends of said coupling, substantially as set forth.

4. In a device of the character described, the combination with a block adapted to be secured to the tube of a bicycle-frame and provided with a transverse aperture, of a pivotal pin inserted through said aperture and having its ends screw-threaded, sleeves having screw-threaded ends, the inner ends of said sleeves being screwed upon the ends of the pivotal pin, said sleeves being provided with vertical apertures, a wheel-holder comprising arms inserted through the apertures of the sleeves and adapted to grasp with their lower ends the steering-wheel and hold it against movement, and set-screws inserted in the outer ends of the sleeves for clamping said arms to the sleeves, substantially as set forth.

5. In a device of the character described, the combination with a supporting-block and a hinge pivotally connected therewith and provided with alined guide-eyes, of an extensible prop-leg consisting of a tube or rod, a set-screw for clamping the rod to one of the guide-eyes and a set-screw for clamping the tube in adjusted position to the rod, substantially as set forth.

6. In a device of the character described, the combination with a supporting-block and a hinge pivotally connected therewith and provided with alined guide-eyes, of an extensible prop-leg consisting of a tube or rod, a set-screw for clamping the tube in adjusted position to the rod, said tube being provided at its upper end with a stop-ring and said rod being provided at its lower end with a head adapted to engage the stop-ring and thus prevent the accidental withdrawal of the rod from the tube, substantially as set forth.

In testimony whereof I have hereunto set my hand in presence of two subscribing witnesses.

HENRY M. FALCINA.

Witnesses:
A. G. KITTLEFIELD,
FRANK H. INGRAHAM.